(12) United States Patent
Molstad et al.

(10) Patent No.: US 6,999,258 B2
(45) Date of Patent: Feb. 14, 2006

(54) TIME-BASED SERVOPOSITIONING SYSTEMS

(75) Inventors: Richard W. Molstad, St. Paul, MN (US); Yung Yip, Afton, MN (US)

(73) Assignee: Imation Ccorp., Oakdale, MN (US)

( * ) Notice: Subject to any disclaimer, the term of this patent is extended or adjusted under 35 U.S.C. 154(b) by 357 days.

(21) Appl. No.: 10/087,415

(22) Filed: Mar. 1, 2002

(65) Prior Publication Data

US 2003/0165029 A1 Sep. 4, 2003

(51) Int. Cl.
*G11B 5/09* (2006.01)
*G11B 5/584* (2006.01)

(52) U.S. Cl. .................... 360/48; 360/77.12; 360/77.14
(58) Field of Classification Search .................. 360/48, 360/51, 75, 77.01, 77.12, 77.13, 77.14, 77.15, 360/78.02
See application file for complete search history.

(56) References Cited

U.S. PATENT DOCUMENTS

| | | | |
|---|---|---|---|
| 5,426,543 A | 6/1995 | Dy et al. | 360/77.12 |
| 5,689,384 A | 11/1997 | Albrecht et al. | 360/77.12 |
| 5,898,533 A | 4/1999 | Mantey et al. | 360/48 |
| 5,930,065 A | 7/1999 | Albrecht et al. | 360/72.2 |
| 6,021,013 A | 2/2000 | Albrecht et al. | 360/53 |
| 6,130,799 A * | 10/2000 | Sato | 360/77.14 |
| 2003/0123174 A1 * | 7/2003 | Hennecken et al. | 360/51 |

* cited by examiner

*Primary Examiner*—Andrew L. Sniezek
(74) *Attorney, Agent, or Firm*—Eric D. Levinson

(57) ABSTRACT

Servo positioning systems, methods, formats, and data recording media used in association with the same, employing additional timing reference information to improve immunity to time-based errors caused by instantaneous speed variations.

27 Claims, 4 Drawing Sheets

TIME-BASED SERVOPOSITIONING SYSTEMS

FIELD OF THE INVENTION

This invention concerns systems and methods for time-based servo positioning in the context of linear data recording media such as magnetic tape.

BACKGROUND OF THE INVENTION

Modern data storage systems use servo positioning (or "servo") systems to guide their recording and playback components with respect to a recording medium, and thus enable high track density, which increases data storage capacity. Errors in the ability to follow the servo positioning signals on the medium can cause unacceptable reductions in storage capacity, recording/playback rates, and other parameters that are important to consumers (and thus to system manufacturers).

One type of servo patterns or formats for linear magnetic tape recording systems employs so-called time-based servo techniques, examples of which are disclosed in U.S. Pat. Nos. 5,689,384; 5,930,065; and 6,021,013 (all of which are incorporated by reference in their entireties). Commercial magnetic tape drives such as the IBM model 3570 and drives known under the names "Ultrium" and "Accelis," as described by the Linear Tape Open consortium, use time-based servo positioning systems.

The advantages of time-based servo systems include very wide dynamic range; inherent track identification; low DC centerline error; and the ability to qualify position error signal (PES) validity by the amplitude of the servo signal. Disadvantages include extreme sensitivity to tape speed during writing; sensitivity to high frequency speed error during reading; and poor scalability to very small track pitches.

SUMMARY OF THE INVENTION

In general terms, the invention may be embodied in time-based servo positioning systems, methods, and formats, or in data recording media used in association with the same, and therefore this disclosure should be understood in that regard even if only an example of a particular embodiment is described in detail. Similarly, this disclosure should be understood to apply to either analog or digital signals, in accordance with principles known in the art. Thus, the terms "signal," "data," and the like may be used interchangeably, and should be understood to apply to either analog or digital representations of information.

In the most basic embodiment of the invention, a servo positioning system for a data recording system is used in combination with a linear data recording medium, preferably magnetic recording tape. Written or recorded on the medium are a timing reference (for example, a high frequency AC "pilot tone") and a conventional time-based servo signal. Appropriate circuitry is separately responsive to the two signals so they can be separated from each other. The circuitry produces position error signals by sampling the time-based servo signal at a sampling rate, and also increases the bandwidth of the timing reference signal above that sampling rate. In the preferred embodiment, the two types of signals are written onto the same location of the recording medium, but the high frequency pilot tone signal is written such that its frequency lies in a playback null of the time-based servo positioning system. Any technique for accomplishing this is suitable, but in the most preferred embodiment the two signals are recorded at different azimuth angles with respect to each other (i.e., relative to the playback head of the system).

BRIEF DESCRIPTION OF THE DRAWINGS

The accompanying drawings show a particular embodiment of the invention as an example, and are not intended to limit the scope of the invention.

FIG. 2b is an enlarged view of the portion of FIG. 2a indicated by the circle designated 2b.

DETAILED DESCRIPTION

In general terms, the invention can be embodied in an entire system of data recording and playback, including the combination of a drive and a linear recording medium; or as only the recording medium portion of such a system; or as methods for recording or playing back data in combination with the data recording medium. Thus, while the following description may occasionally focus on only one aspect of an entire system (e.g., the recording medium alone) to disclose the preferred embodiment of the invention, this is by way of example only, and not a limitation on the scope of the invention. It should be understood that the full scope of the invention includes other aspects of the system depending on the circumstances, such as combinations of the medium and drive, and methods of using such combinations or relevant portions of them.

The time-based servo system described in U.S. Pat. Nos. 5,689,384 and 6,021,013 is somewhat immune to speed error (or time-based error) in playback by the use of a reference pulse to compare against the PES (Position Error Signal) pulse. The system is only somewhat immune, because as the frequency of the speed error increases up to the sample rate of the PES system itself the natural immunity generated by the reference normalization procedure decreases.

Data recording systems using tape media can have considerable time-based error (also known as instantaneous speed variation, or ISV) at frequencies approaching commercially standard PES sample rates. The invention improves the time normalization performance (and thereby the immunity to ISV) of linear data recording systems by effectively increasing the reference time-based bandwidth until it is greater than the PES sample rate.

Figure 1:
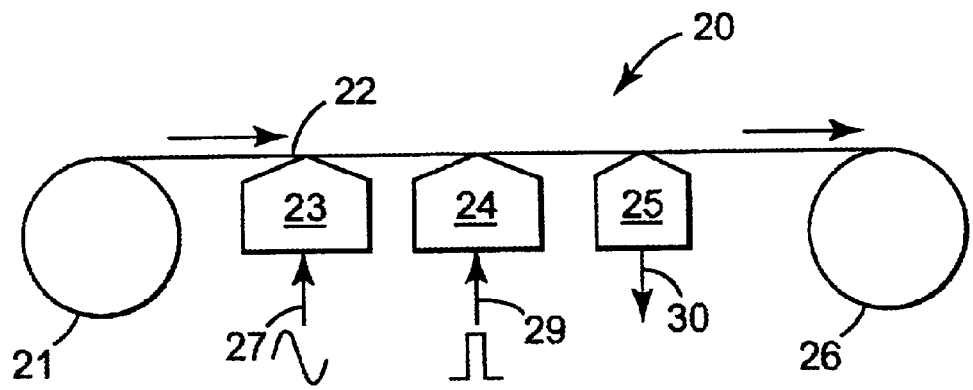
FIG. 1 is a schematic diagram of one embodiment of the invention.

FIG. 1 is a schematic view of one recording system embodiment suitable for this approach, using (for purposes of illustration only) magnetic recording tape as the preferred type of linear recording medium.

Recording system 20 comprises supply reel 21, tape 22, pilot tone recording head 23, time-based servo write head 24, verify head 25, and take-up reel 26. An AC bias signal 27 is the input to pilot tone recording head 23. A current pulse signal 29 is the input to time-based servo write head 24. Verify head 25 produces verify signal 30 that typically passes through a conventional preamplifier (not shown) to become input signal 41 of FIG. 4 (described below).

Figure 2A:
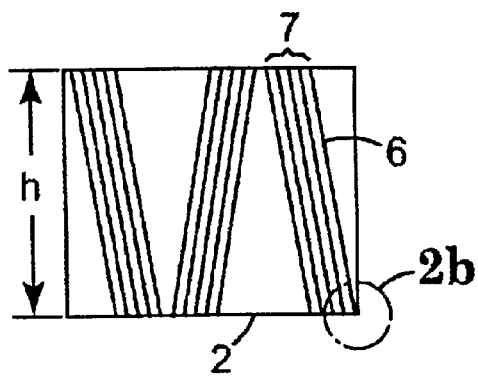
FIGS. 2a, 2b, and 3 are schematic views of geometric aspects of the embodiment of FIG. 1.
Figure 2B:
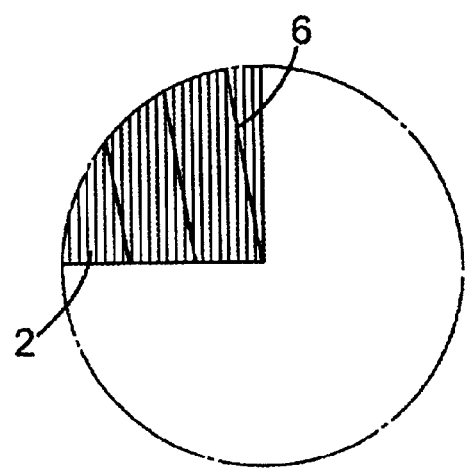

FIGS. 2a and 2b schematically show a full-width servo band of height h superimposed on a "sea" of high-density pilot tone 2 produced by pilot tone recording head 23, which is subsequently used for playback speed tracking. The time-based servo pulses 6 produced by time-based servo write head 24 overwrite this tone. By way of example only, the servo pattern has five pulses 6 per sample 7. The high-density tone is largely unaffected by the servo pulses because the servo pulses are written using a return-to-zero technique meaning the write current is mostly turned off. In general, the high frequency signal 2 is recorded at a wavelength such that its frequency lies in a playback null of the time-based servo positioning system.

Figure 3:
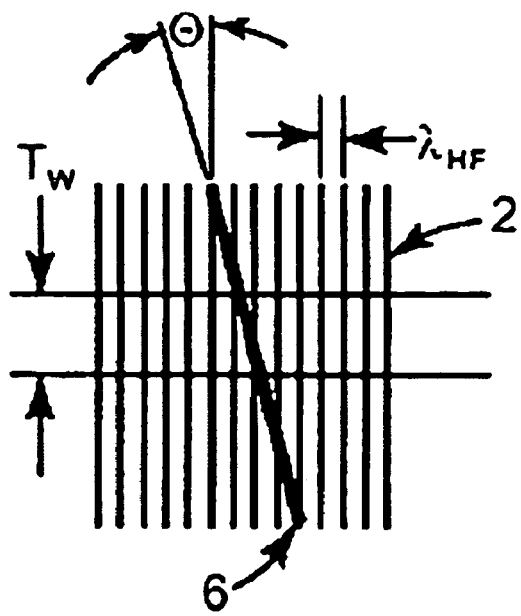

In the preferred embodiment, the two signals are recorded at different azimuth angles with respect to each other. Referring additionally to FIG. 3, for a given read track width $T_w$ and a given slant angle $\theta$, there is a natural spatial frequency null at a wavelength $\lambda_{HF}$ proportional to the read track width and the tangent of the slant angle $\theta$, or $\lambda_{HF} = T_w * \tan(\theta)$. Thus, placing the pilot tone in the azimuth null of the time-based servo enables both signals to be available after suitable filtering. For example, given a read track width of 5 micrometers and an angle $\theta$ of ±8 degrees, $\lambda_{HF}$ occurs at the reasonable density of 72,300 flux changes per inch (fci). This density is well within the capability of a tape and a head designed for >150 kbpi data recording. At two meters/second media speed, this density corresponds to a frequency of 2.8 MHz, easily enabling a phase locked loop tracking bandwidth above 50 kHz, or approximately 10 times the typical ISV resonant frequency of the medium. These are examples only and not limitations on the scope of the invention.

Figure 4:
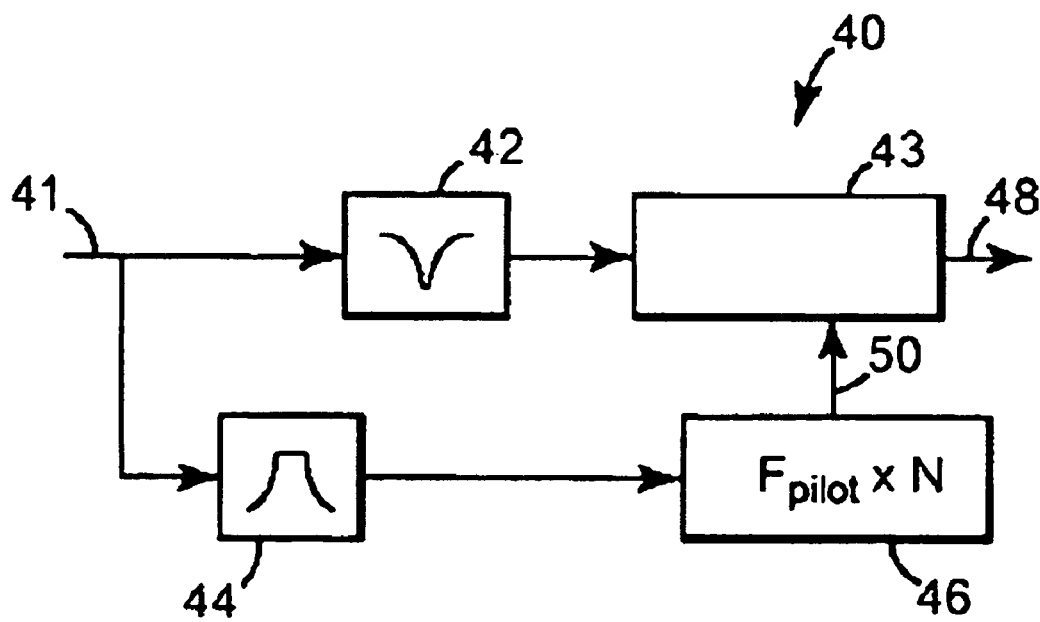
FIG. 4 is a schematic diagram of another aspect of the embodiment of FIG. 1.

A preferred system to fully utilize this signal structure is shown schematically in FIG. 4 as circuitry 40. Circuitry 40 receives an input signal 41 produced by the conventional read head preamp (not shown) as described above. This signal is input to both a band reject ("notch") filter 42 and a band pass filter 44. Notch filter 42 eliminates the high density pilot tone component but has little effect on the time pulse, because the filter notch is at the same frequency as the natural azimuth loss notch. The filtered time pulse is thereafter processed normally, as described in U.S. Pat. No. 6,021,013, with one crucial difference; the measurement time base normally derived from an external clock is derived from the high-density signal.

Specifically, the portion of the signal that passes through band pass filter 44 is the input to a phase locked loop (PLL) 46 that produces a measurement time base signal 50 for the time-based demodulator circuit 43. The band pass is only wide enough to pass the signal and its anticipated FM sidebands, e.g. for the case above, 2.8 MHz±100 kHz. This narrow 200 kHz bandwidth is more then eleven decibels quieter than the regular data channel, and therefore this reference tone signal has good signal-to-noise ratio, even when recorded at a low level. (The smaller read track width of the servo read head circuitry makes this narrow band high frequency signal perhaps only 8 db better than the read channel at the same density.) The PLL locks onto this frequency and generates a frequency tracking reference clock for the time-based servo detector circuit. This clock could be any rational multiple of the recorded tone. For example, for the rational multiple of 107 to three, the reference clock signal will be 2.8 MHz×107/3=99.8 MHz.

The high density signal actually serves at all times as a reference, and therefore has some advantages over the traditional "interval" reference as described in U.S. Pat. No. 6,031,013, particularly at column 7, line 30 to column 8, line 2. First, the need for the "B interval" is eliminated altogether and replaced by the need to know when the "A interval" (or measurement period), as described in the same patent, begins. This enables a higher PES sample rate, because eliminating the reference measurement reduces constraints on the design of the format. Second, since the time-based reference is known at the same time that the PES measurement is known, and because a sampling delay appears to the servo system as if it were a phase lag, there is little PES sampling phase delay, by a factor of as much as one-half the sample time. This enables higher servo performance.

In the preferred embodiment of this scheme, and as taught in U.S. Pat. No. 6,021,013, multiple PES bursts are recorded together, such as in groups of four or five. The spacing between these pulses should be such that the pulses fall on unique phases of the high frequency tone. For example, if the first pulse in a group of four pulses falls on the zero degree phase of the high frequency signal, the second pulse should fall on the [N cycles plus] ninety degree phase of the next pulse. Similarly, the third pulse should fall on the [N cycles plus] 180 degree phase, and the fourth pulse at the [N cycles plus] 270 degree phase. Since the PES is calculated by taking the average of these four values, any possible bias caused by the high frequency tone may be averaged out according to known principles.

Figure 5:
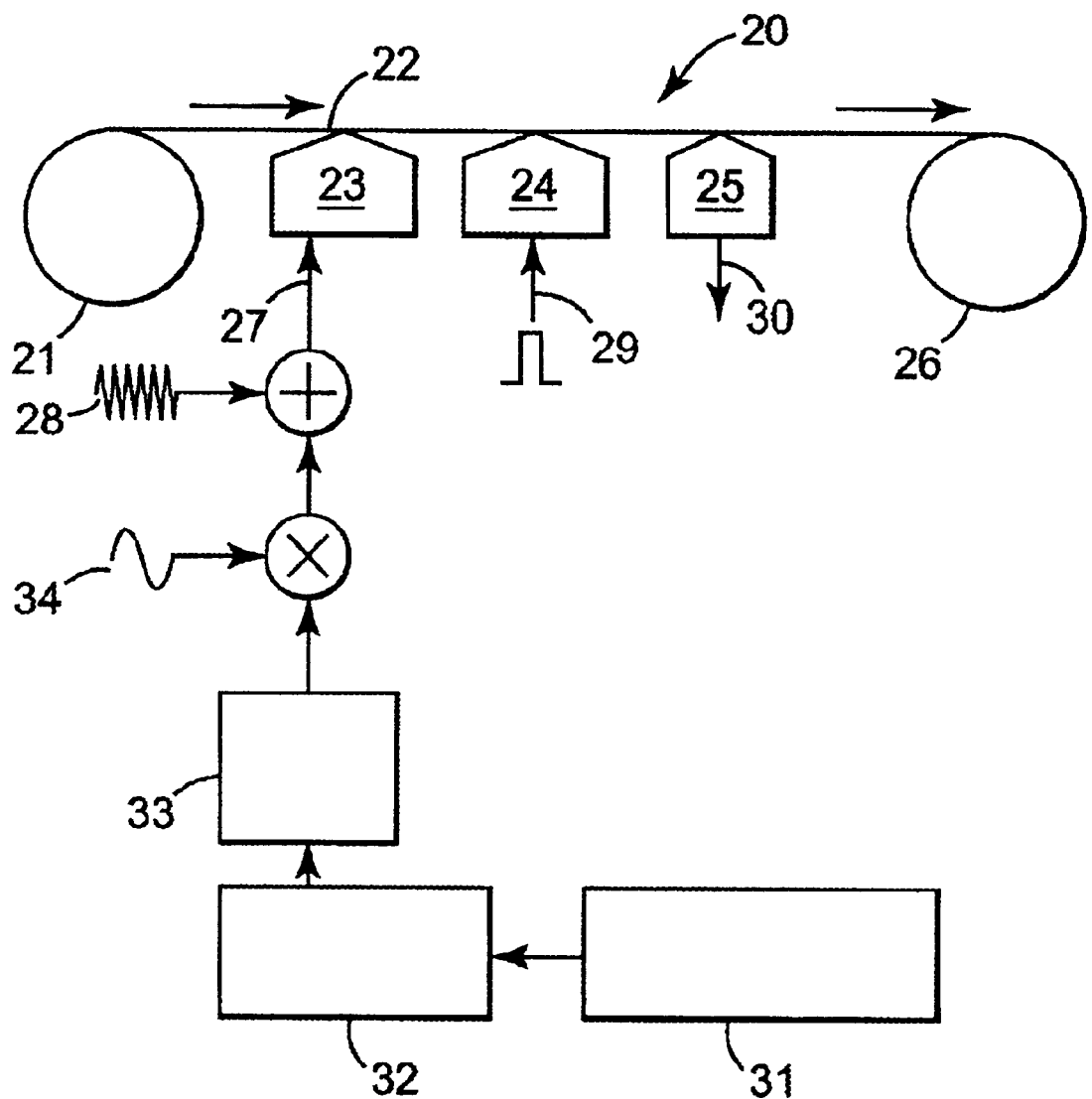
FIGS. 5 and 6 are schematic diagrams of a preferred embodiment of the invention.

In another preferred embodiment of the invention, the pilot tone is modulated with a (preferably double) side band AM component without affecting the timing functionality, provided the modulation does not approach 100% negative, which would negate the pilot tone signal entirely. For example, as illustrated in FIG. 5, pilot tone 27 is formed by combining an AC bias signal 28 (for example, a sine wave signal in the range of eighty to three hundred kfci) and modulation carrier 34 (for example, a sine wave signal in the range of approximately twenty to one hundred kfci). The modulation content may comprise linear position (or "LPOS") data, or auxiliary data (e.g. manufacturing data) as indicated at 31, and general purpose data such as synchronization signals and error correction/detection data as indicated at 32. Other content may include encoding data as indicated at 33, including "biphase" or Manchester encoding, NRZ, NRZI, PR4 and other known encoding techniques; however, quadrature amplitude ("I&Q") modulation schemes may not be desirable because the primary timing task of the carrier signal is adversely affected. Manchester encoding provides the advantage of simplified decoding due to the simpler embedded clock structure.

The resolution of the linear position data may be as coarse as 10 cm to as fine as 1 cm, although greater resolution requires greater bandwidth which is undesirable because it reduces the robustness of the signal. Assuming digital modulation bandwidth (double sided) of the pilot tone carrier of approximately 10 KHz and a tape speed of 2 m/s, Manchester encoding would encode 2.5 kbps or 1.25 bits/mm; thus, 125 bits would be encoded in a span of 10 cm, which is sufficient for an accurate LPOS signal. Other more sophisticated encoding schemes could produce as much as 50 bits/cm in the same bandwidth.

Figure 6:
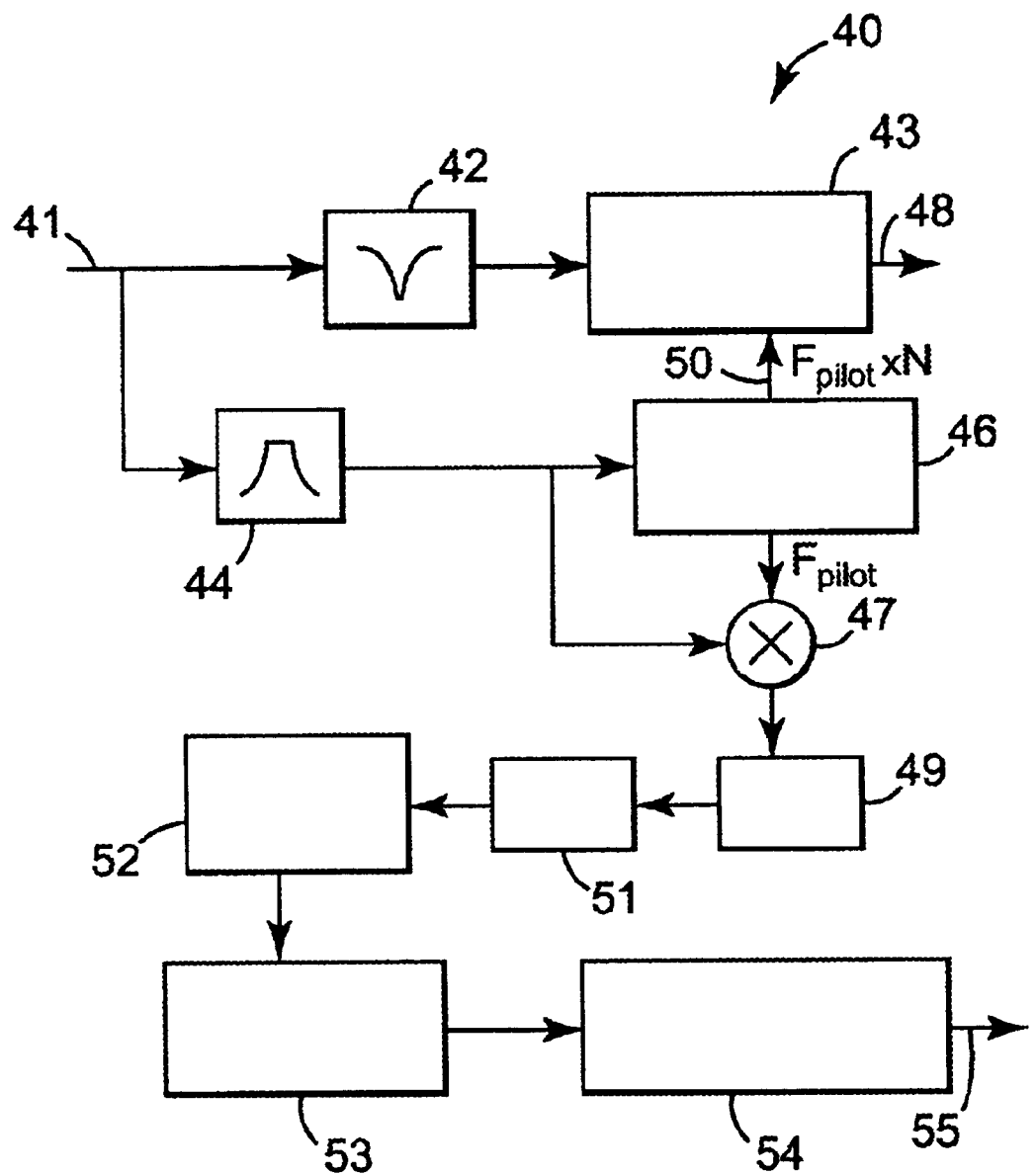

FIG. 6 is a schematic diagram of the receiver for this embodiment. The AM signal first passes through band pass filter 44 and is an input to the phase locked loop 46, which tracks its frequency and phase. The primary use of this input is to time the time-based servo pulses, as in the embodiment described above, and also to synchronously demodulate the AM signal by use of an analog multiplier 47. The output of analog multiplier 47 passes sequentially through a low pass filter 49; a detector 51; a channel code demodulator 52; appropriate encoding 53 for data words, sync signals, and error correction codes, as applicable; and suitable LPOS counters and auxiliary text memory 54. The result is an output signal 55 that is transferred to the drive controller of the system (not shown).

We claim:

1. A servo positioning system for a linear data recording system, comprising in combination:
   a) a linear data recording medium, upon which are recorded a time-based servo signal, and a timing reference signal having a bandwidth; and
   b) circuitry, separately responsive to the timing reference and time-based servo signals, for
      (i) producing position error signals by sampling the time-based servo signal at a sampling rate; and
      (ii) increasing the bandwidth of the timing reference signal above the sampling rate of (i).

2. The system of claim 1, in which the measurement time base for producing the position error signals is derived from the timing reference signal.

3. The system of claim 1, in which the timing reference signal's frequency lies in a playback null of the time-based servo positioning system.

4. The system of claim 3, in which the timing reference signal and the time-based servo signal are recorded at different azimuth angles with respect to each other.

5. The system of claim 3, in which the time-based servo signal comprises at least one sample, each sample comprising at least two pulses, the spacing between the pulses being such that the pulses fall on unique phases of the timing reference signal.

6. The system of claim 5, in which there are four pulses in each sample, each of the four pulses falling ninety degrees out of phase with each other, and a first pulse falling on a zero degree phase of the timing reference signal.

7. The system of claim 1, in which the timing reference signal further comprises a side band amplitude modulated component.

8. The system of claim 7, in which the timing reference signal further comprises a double side band amplitude modulated component.

9. The system of claim 7, in which the modulated component comprises at least one of linear position data, manufacturing data, synchronization data, error detection data, error correction data, and encoded data.

10. A method of servo positioning for use with a data recording system, comprising:
    a) writing on a linear data recording medium a time-based servo signal, and a timing reference signal having a bandwidth;
    b) producing position error signals by sampling the time-based servo signal at a sampling rate; and
    c) increasing the bandwidth of the timing reference signal above the sampling rate.

11. The method of claim 10, further comprising deriving the measurement time base for producing the position error signals from the timing reference signal.

12. The method of claim 10 in which writing the timing reference signal comprises writing an AC frequency that lies in a playback null of the time-based servo positioning system.

13. The method of claim 12, in which the writing comprises writing the timing reference signal and the time-based servo signal at different azimuth angles with respect to each other.

14. The method of claim 12, in which the time-based servo signal comprises at least one sample, each sample comprising at least two pulses, the spacing between the pulses being such that the pulses fall on unique phases of the timing reference signal.

15. The method of claim 14, in which there are four pulses in each sample, each of the four pulses falling ninety degrees out of phase with each other, and a first pulse falling on a zero degree phase of the timing reference signal.

16. The method of claim 10, in which the writing further comprises writing a side band amplitude modulated component in the timing reference signal.

17. The method of claim 16, in which the writing further comprises writing a double side band amplitude modulated component in the timing reference signal.

18. The method of claim 16, in which the writing further comprises writing in the modulated component at least one of linear position data, manufacturing data, synchronization data, error detection data, error correction data, and encoded data.

19. A linear data recording medium comprising:
    a recorded time-based servo signal including servo samples recorded in a servo band, wherein each of the servo samples includes a set of two or more time-based servo pulses recorded at different azimuths and extending across the servo band; and
    a recorded timing reference signal recorded in the servo band, wherein the time-based servo pulses are superimposed with the timing reference signal.

20. The linear data recording medium of claim 19, wherein the servo samples define a servo sample rate for the medium and wherein a bandwidth of the timing reference signal is greater than the sample rate.

21. The linear data recording medium of claim 19, wherein the timing reference signal is a modulated timing reference signal.

22. The linear data recording medium of claim 21, wherein the timing reference signal is modulated with linear position (LPOS) information.

23. The linear data recording medium of claim 19, wherein the time-based servo pulses are recorded in the servo band relative to the timing reference signal such that different pulses are recorded at different phases of the timing reference signal.

24. A method comprising:
    recording a timing reference signal throughout a servo band of a linear data recording medium; and
    recording a time-based servo signal in the servo band, the time-based servo signal including a set of two or more time-based servo pulses recorded at different azimuths and extending across the servo band of the medium, wherein the time based servo pulses are superimposed with the timing reference signal.

25. The method of claim 24, further comprising modulating the timing reference signal to encode linear position (LPOS) information on the medium.

26. A servo positioning system comprising:
    a linear data recording medium comprising a recorded time-based servo signal including servo samples recorded in a servo band, wherein each of the servo samples includes a set of two or more time-based servo pulses recorded at different azimuths and extending across the servo band, and a recorded timing reference signal recorded in the servo band, wherein the time based servo pulses are superimposed over the timing reference signal;
    a head positioned to read the signals recorded in the servo band; and
    circuitry to separate the time-based servo signal and the timing reference signal, and demodulate the time-based servo signal using the timing reference signal.

27. The servo positioning system of claim 26, wherein the circuitry generates position error signals based on the demodulated the time-based servo signal and adjusts positioning in of the head based on the position error signals.

* * * * *